United States Patent Office 3,438,615
Patented Apr. 15, 1969

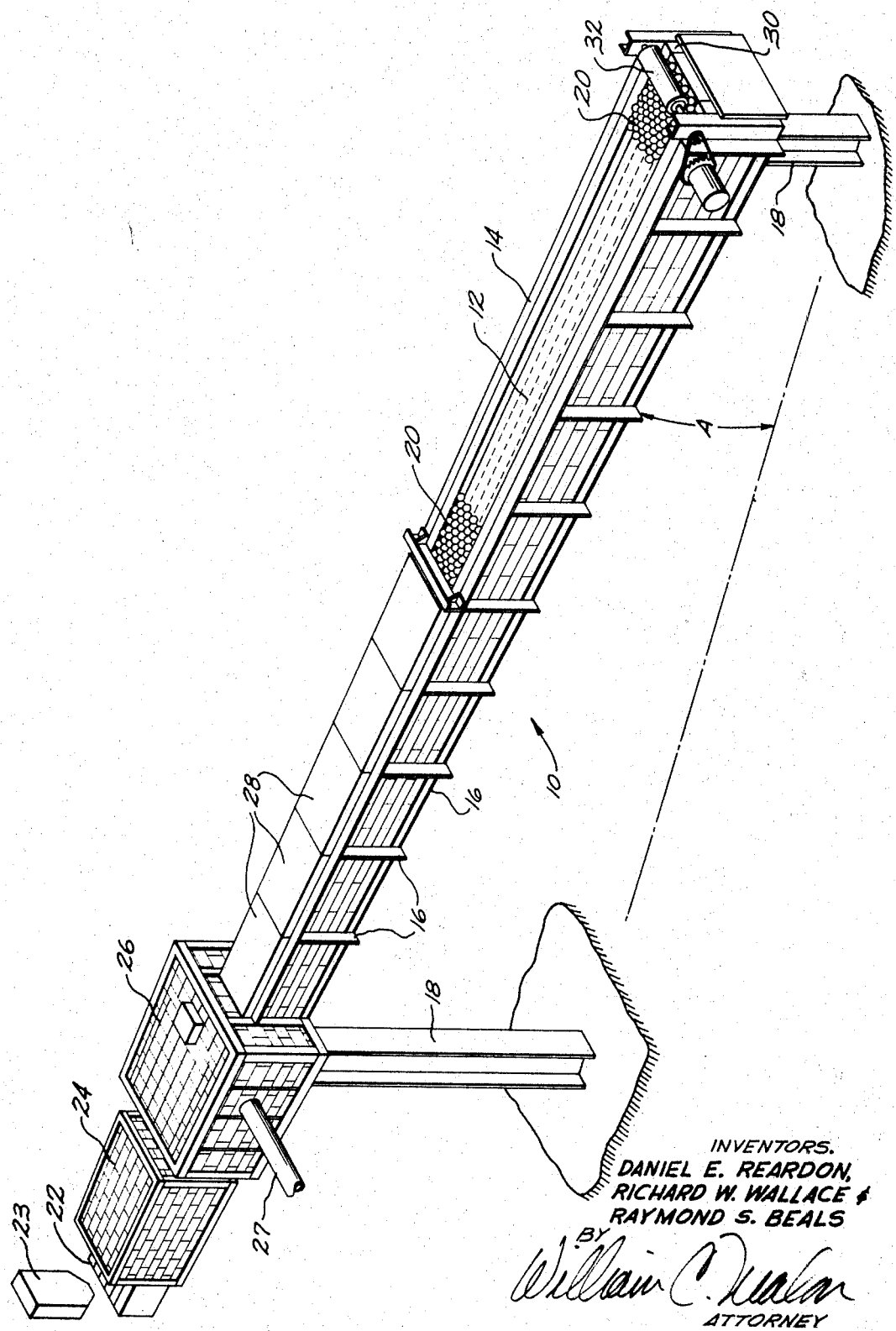

3,438,615
INCLINED KILN
Daniel E. Reardon, Bethel Park, and Richard W. Wallace and Raymond S. Beals, Pittsburgh, Pa., assignors to Dresser Industries, Inc., Dallas, Tex., a corporation of Delaware
Filed May 23, 1967, Ser. No. 640,731
Int. Cl. F27d 9/14, 3/18
U.S. Cl. 263—6      9 Claims

ABSTRACT OF THE DISCLOSURE

The present invention is directed to a static kiln for uniformly burning, in a continuous manner, ceramic or refractory spheres, rods and similar articles. The kiln consists of a flat hearth which is disposed at an acute angle from the horizontal wherein the ceramic wear can be fed at the top of the kiln and allowed to descend by gravity through the burning zone and ultimate discharge. The rate of descent of the ceramic ware is controlled at the discharge end of the kiln and can be varied.

---

Refractory articles have often been fabricated in the shape of spheres of all sizes and rods for various applications. For example, balls are used in blending mills for processing chemicals and ceramic materials. They have been used in heat exchange apparatus. Ceramic rods have been used, among other things, for combustion tubes and insulating tubes.

These ceramic wares are generally composed of a very finely divided refractory material, i.e., high alumina, and are prepared by mixing the refractory material with a temporary binder, isostatically pressing and firing at an elevated temperature to provide a hard, dense body. The shapes obviously could be fired in a periodic type of kiln in which they are disposed on a hearth, fired and removed manually. However, such periodic operations are not very economical.

Thus, the trend has been to burn these ceramic shapes in a vessel capable of doing so continuously. The greatest problem confronting manufacturers of refractory spheres with regard to burning, is the fact that after the temporary binder ablates, which occurs during burning, the spheres become very brittle and require delicate handling. The commonest way to fire refractory spheres and the like is to load them in saggers and pass through a tunnel kiln. While such operation is continuous, it takes a great deal of time and, as in a periodic kiln, all surfaces of the sphere are not heated uniformly.

Prior workers have suggested burning the shapes in a rotary kiln. But, as can be appreciated, the rotation of the kiln causes the spheres or any shape for that matter, to engage in constant collisions and breakage is emminent. Shaft kilns have also been suggested, however, the bearing pressure of the spheres at the top of the kiln on the ones in the middle cause breakage.

Accordingly, it is an object of the present invention to provide a novel static type kiln for uniformly burning closely packed columns of ceramic spheres, rods and similar ware in a continuous manner while substantially eliminating fracture thereof.

In the drawing, there is shown in an isometric view, a static kiln according to the present invention.

Briefly, the kiln consists of an elongated, relatively flat hearth containing upwardly extending side walls for retaining the ware. The hearth is disposed at an acute angle from the horizontal so that the feed end is higher than the discharge end. The angular disposition is sufficient to allow gravity descent of the ware from the feed to the discharge end. The inclination found most suitable for a variety of sizes of refractory spheres is approximately 22°. The practical maximum angle of inclination appears to be about 30°, since at greater inclinations, owing to the close packed relationship in which the ware descend, either the bearing pressure of the upper ware on the lower ware becomes sufficient to cause breakage or the ware tends to buckle.

The kiln also contains means for feeding the ware to the hearth at the feed end, means for burning the ware on the hearth, and drive means positioned at the discharge end in constant engagement with the ceramic ware to control the rate of descent and provide discharge thereof.

Referring to the drawing, there is shown the inclined static kiln 10 of the present invention. The hearth 12 of the kiln is relatively long and narrow and contains a flat bed which is fabricated from refractory brick. The hearth contains slightly upwardly extending side walls 14 to retain the ware being burned. The side walls are also fabricated from refractory brick. The side walls and hearth are supported by structural steel members 16 which extend from end to end. The entire kiln in turn is supported on structural beams 18 and is inclined at an angle A of approximately 22° from the horizontal. If desired, the structural beams could be in the form of adjustable jacks to vary the angle of inclination in different instances.

The ceramic spheres 20 or rods are fed to the hearth of the kiln at the upper or feed end 22. There a hopper 23, conveyor or other equivalent means is disposed for providing a constant supply of ceramic ware to the hearth.

Located near the feed end is the preheating zone of the kiln. In this zone, the hearth is completely encapsulated with refractory brick to provide a box-like structure 24 for providing the preheating temperature. Separated, but adjacent, the preheating zone is a similar box-like structure 26 which is the burning zone. Burners are located in structure 26 to maintain the high firing temperature desired. The gases are exhausted through structure 24 to provide the preheating temperature. While a single box-like housing unit may serve to provide both zones, two housings are preferred. Below the burning zone, a short distance, the hearth contains removable refractory covers 28, which extend across the tops of the side walls to prevent heat loss. While the drawing shows the hearth below this point to be open to the atmosphere, a removable refractory cover may be provided, if desired.

Disposed at the lower or discharge end, 30, of the kiln is a compressible roller 32 which extends across the side walls. The compressible roller bears down upon the fired refractory ware 20 to control the rate of descent from the feed end to the discharge end and ultimately discharges the ware. The roller can be driven at variable speeds to provide the necessary period of time for burning the ceramic ware in the firing zone.

In practice, ceramic spheres which have previously been burned and ceramically bonded are placed on the hearth at the discharge end of the kiln from side wall to side wall in a column orderlike arrangement. The first column or row of spheres is disposed directly below the compressible roller which is the drive means. Additional spheres are placed on the hearth upwardly toward the feed end in close packed arrangement so that each sphere is in abutting relationship with two or more other spheres. This arrangement is continued at least up to the entrance of the preheating chamber. From the entrance of the preheating chamber to near the feed end of the kiln the hearth is lined with unburned refractory spheres in a similar close-packed arrangement. All of the spheres, of course, are laid one high along substantially the entire length of the hearth.

The compressible roller, which in this case is chain driven, is then activated so that it begins to rotate at a speed necessary to provide the adequate residence period for the unburned spheres in the preheating and firing chambers. As the roller rotates, ceramic spheres are discharged and the spheres thereabove progress downwardly by gravity flow. By gravity flow, it is meant that the ware descends by rotation without substantial sliding or friction. The feed hopper provides a continuous supply of spheres in close packed arrangement at the feed end.

As the spheres pass through the preheating zone the temporary binder is driven off and the spheres become very weak. The rotation of the spheres along the hearth provides uniform heating thereof. Owing to the rotational descent of the ware substantially without friction, their contact with adjacent spheres which are also rotating is not severe enough to cause breakage.

The spheres then pass through the firing zone which is maintained at an elevated temperature to provide ceramic bonding thereof. After passing through the firing zone, the spheres descend downwardly and are air cooled and ultimately discharged by the drive mechanism.

In a continuous operation, the ceramic ware may be conveyed by a vertical conveyor from a supply station to the feed end of the kiln. The speed of the conveyor is timed with the speed or rotation of the drive mechanism so that as one sphere is released at the discharge end, one sphere will be deposited at the feed end. The close packed descending bed of spheres may begin at some point intermediate the entrance to the preheating chamber and the actual feed end of the hearth, to prevent back-up of the spheres in the event they jam at some point along the hearth. A detection device, such as a photoelectric cell which is operatively interconnected with the activating and deactivating mechanisms of the driver mechanism and the conveyor system may be disposed a short distance from the beginning of the bed of spheres to automatically detect a back-up of spheres to that point, due to jamming, and terminate the movement of spheres.

Since certain changes in the apparatus described and in carrying out the above process may be made without departing from its scope, it is intended that the accompanying description and drawing be interpreted as illustrative and not limiting. For example, while a compressible roller is shown in the drawing as the drive means, other means, such as, a roller with blades thereacross or pockets therein or a conveyor belt may also be employed, as long as the means constantly engages the ware to control the descent.

Having thus described the invention in detail and with sufficient particularity as to enable those skilled in the art to practice it, what is desired to have protected by Letters Patent is set forth in the following claims.

We claim:

1. A static kiln for burning a continuously descending bed of ceramic spheres, tubular rods and similar ware consisting essentially of an elongated, relatively flat hearth having upwardly extending sidewalls for retaining said ware, the elongated hearth having a feed end and a discharge end and being disposed at an acute angle from the horizontal such that the feed end is disposed above the discharge end, said angular disposition being sufficient to allow gravity descent of the ware substantially without friction from the feed end to the discharge end, means for feeding the ware to the hearth at the feed end, means for burning the ware on the hearth and compressible drive means disposed at the discharge end above the hearth which bears down upon the ceramic ware to control the rate of descent and ultimate discharge thereof.

2. The kiln of claim 1 in which the hearth in at least the burning zone is composed of refractory material.

3. The kiln of claim 1 in which the hearth contains a metal supporting structure.

4. The kiln of claim 1 in which the means for burning the ware is enclosed within a housing composed of refractory material which also envelops completely a portion of the hearth.

5. The kiln of claim 1 in which the drive means is a cylindrical roller which bears down upon the burned ware prior to discharge.

6. The kiln of claim 1 in which the angle of inclination is approximately 22°.

7. The kiln of claim 1 in which the angle of inclination is no greater than about 30°.

8. A static kiln for burning a continuously descending bed of ceramic spheres, tubular rods and similar ware consisting essentially of an elongated, relatively flat hearth having upwardly extending sidewalls for retaining said ware, the elongated hearth having a feed end and a discharge end and being disposed at an acute angle from the horizontal such that the feed end is disposed above the discharge end, said angular disposition being sufficient to allow gravity descent of the ware substantially without friction from the feed end to the discharge end, a portion of the hearth near the feed end being enclosed by at least one housing composed of refractory material and containing means for preheating and firing the ware, means for feeding the ware to the hearth at the feed end, a compressible roller extending across the sidewalls at the discharge end, the flat hearth containing a single layer of ceramic spheres in close packed arrangement extending from below the compressible roller a major distance upwardly to at least the entrance to the housing, the compressible roller being in constant engagement with the ceramic ware to control the rate of descent and ultimate discharge thereof.

9. A method for continuously burning ceramic spheres, tubular rods and similar ceramic ware comprising providing an elongated, relatively flat hearth having upwardly extending side walls, disposing the hearth at an acute angle to the horizontal to provide a feed end elevated with respect to a discharge end, the discharge end having a drive means engageable with the ceramic ware to control the rate of descent and discharge thereof, there being means for burning the ware adjacent the feed end and means for feeding the ware, lining the hearth with a starter layer of closely packed ceramic ware from the drive means upwardly a major distance to at least the beginning of the burning means, activating the drive means to compressibly engage the ceramic ware and discharge it at a constant rate while simultaneously feeding ceramic ware to be burned at the feed end at an equivalent rate to provide a continuing close packed arrangement of ware from the burning means, allowing the ware to descend by rotation with minimum friction in the close packed layer arrangement to provide uniform heating thereof.

References Cited

UNITED STATES PATENTS

| | | | |
|---|---|---|---|
| 935,275 | 9/1909 | Shaw | 263—6 |
| 1,401,983 | 1/1922 | Hultgren | 263—6 |
| 1,450,161 | 3/1923 | Jones | 263—6 |
| 3,186,695 | 6/1965 | Randall | 263—6 |

JOHN J. CAMBY, *Primary Examiner.*

U.S. Cl. X.R.

263—21.